(12) United States Patent
Friend

(10) Patent No.: US 6,470,987 B1
(45) Date of Patent: Oct. 29, 2002

(54) MOTORCYCLE SKI

(76) Inventor: Bryon Friend, 11515 Baranof St., Kodiak, AK (US) 99615

( * ) Notice: Subject to any disclaimer, the term of this patent is extended or adjusted under 35 U.S.C. 154(b) by 0 days.

(21) Appl. No.: 09/619,737

(22) Filed: Jul. 19, 2000

(51) Int. Cl.[7] .............................................. B62M 27/02
(52) U.S. Cl. ..................................... 180/182; 180/9.34
(58) Field of Search ................................ 180/182, 9.25, 180/9.26, 9.28, 9.32, 9.34, 183, 184; 280/7.12, 13–15; 305/15

(56) References Cited

U.S. PATENT DOCUMENTS

| | | | | |
|---|---|---|---|---|
| 1,476,082 A | * | 1/1922 | Degresse | |
| 1,701,212 A | * | 6/1926 | Nickerson | |
| 1,800,812 A | * | 12/1927 | Arps | |
| 2,864,624 A | * | 12/1958 | Lindelof et al. | 280/11 |
| 4,390,151 A | * | 6/1983 | Schneider | 244/108 |
| 5,253,825 A | * | 10/1993 | Christian | 244/108 |
| 6,234,263 B1 | * | 5/2001 | Boivin et al. | 180/184 |

* cited by examiner

Primary Examiner—Anne Marie Boehler
Assistant Examiner—Tony Winner
(74) Attorney, Agent, or Firm—Michael J. Tavella

(57) ABSTRACT

A ski that attaches to the front of a motorcycle. The ski is designed to pivot, allowing it to be used automatically when needed to keep the front tire from sinking. Unlike other skis, this ski does not interfere with normal operations of the motorcycle. The ski is easily attached to the motorcycle by bolting it to the front fork of the motorcycle. Normally, the front of the ski is angled upward to prevent the ski from digging into snow or sand. In soft ground conditions, the ski pivots down. This pivoting action maintains a constant pressure on the back of the ski that lifts the front tire as it moves up and down in different densities of ground or snow. A pair of springs helps to maintain the balance of forces on the ski as it travels over varied terrain. The springs also return the ski in the elevated "attack" position when the motorcycle returns to solid ground.

8 Claims, 11 Drawing Sheets

MOTORCYCLE SKI

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to skis for motorcycles and particularly to skis for motorcycles, having pivotable mounting systems.

2. Description of Related Art

Motorcycles have been used in all types of conditions and on all types of terrain. When riding on soft surfaces, such as snow or loose sand, they can be dangerous. In such soft materials, the front wheel tends to sink, which can cause the rider to be thrown from the motorcycle. To overcome this problem, people have used skis to try to help "float" the tire over the surface. Some of these skis ride above the ground surface and must be lowered for use. Others are rigidly locked in place, making them limited in their use.

BRIEF SUMMARY OF THE INVENTION

The instant invention overcomes these problems. It is a ski that attaches to the front of a motorcycle. The ski is designed to pivot, allowing it to be used automatically when needed to keep the front tire from sinking. Unlike other skis, the instant invention does not interfere with normal operations of the motorcycle.

The ski is easily attached to the motorcycle by bolting it to the bottoms of the front fork of the motorcycle. The ski is designed to rest at an angle to the normal surface. This is accomplished by the use of brackets that direct the angle of the ski. Normally, the front of the ski is angled upward to prevent the ski from digging into snow or sand. A front bracket maintains this angle. Setting the ski at an angle also helps in controlling the motorcycle in riding over steeply cut snowdrifts or when landing after a jump. A rear brace acts as a bearing point. It supports the weight of the motorcycle if the front tire sinks into a soft spot.

Both braces have guides that line up the ski's strut with the braces as the ski pivots up and down. This pivoting action is needed to maintain a constant pressure on the back of the ski. This downward pressure on the ski lifts the front tire as it moves up and down in different densities of snow. A pair of springs helps to maintain the balance of forces on the ski as it travels over varied terrain. The springs also help hold the ski in the elevated "attack" position.

It is an object of the invention to produce a ski for use with motorcycles that can be attached to any motorcycle with a minimum of mounting hardware.

It is another object of the invention to produce a ski for use with motorcycles that does not interfere with the normal operation of the motorcycle.

It is a further object of the invention to produce a ski for use with motorcycles that automatically lifts the front wheel of the motorcycle whenever the front wheel begins to sink in soft terrain.

It is yet another object of the invention to produce a ski for use with motorcycles that automatically adjusts the lifting force on the front wheel as the softness of the terrain varies.

DETAILED DESCRIPTION OF THE INVENTION

Figure 1:
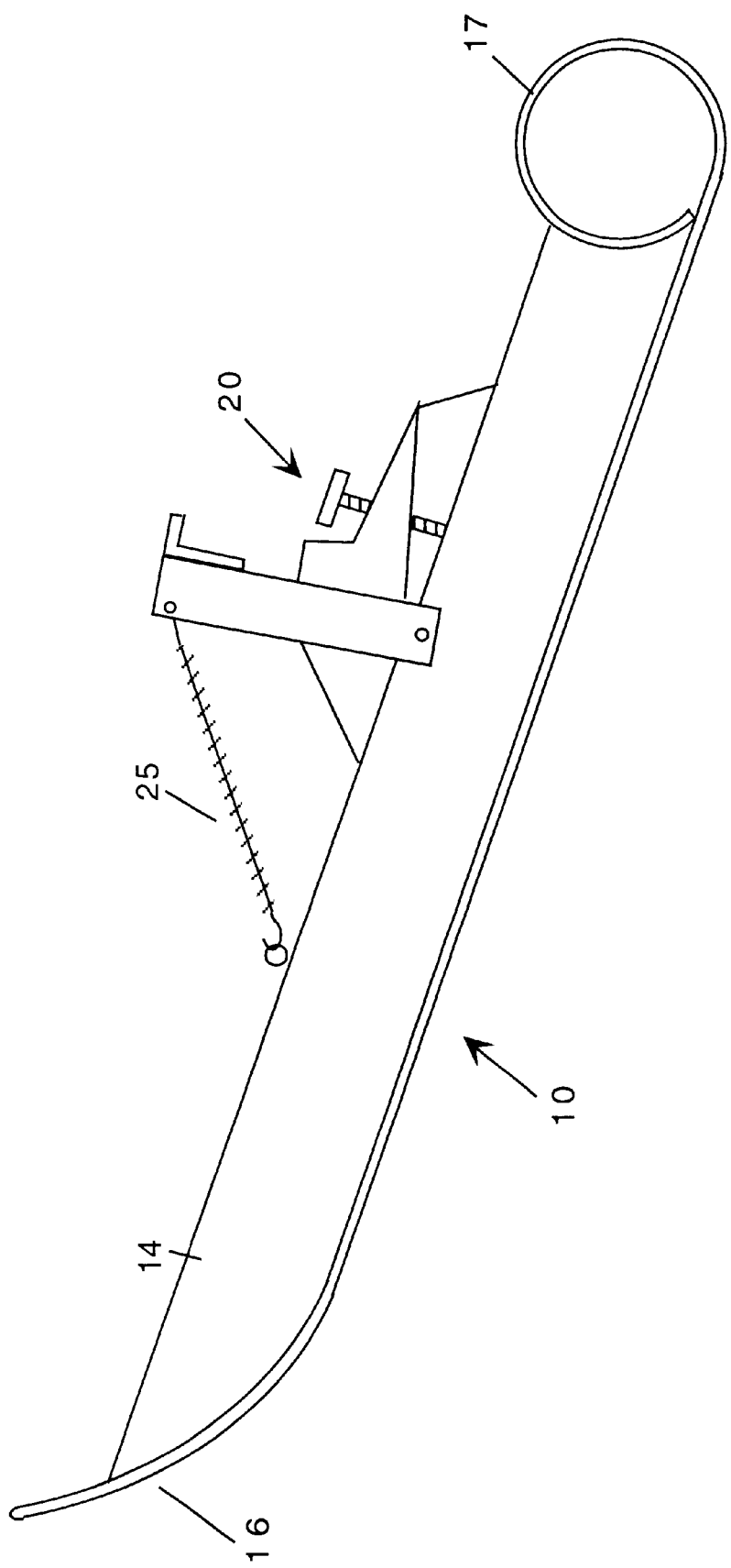
FIG. 1 is an outboard view of the ski shown in its operating position with respect to the ground.
Figure 2:
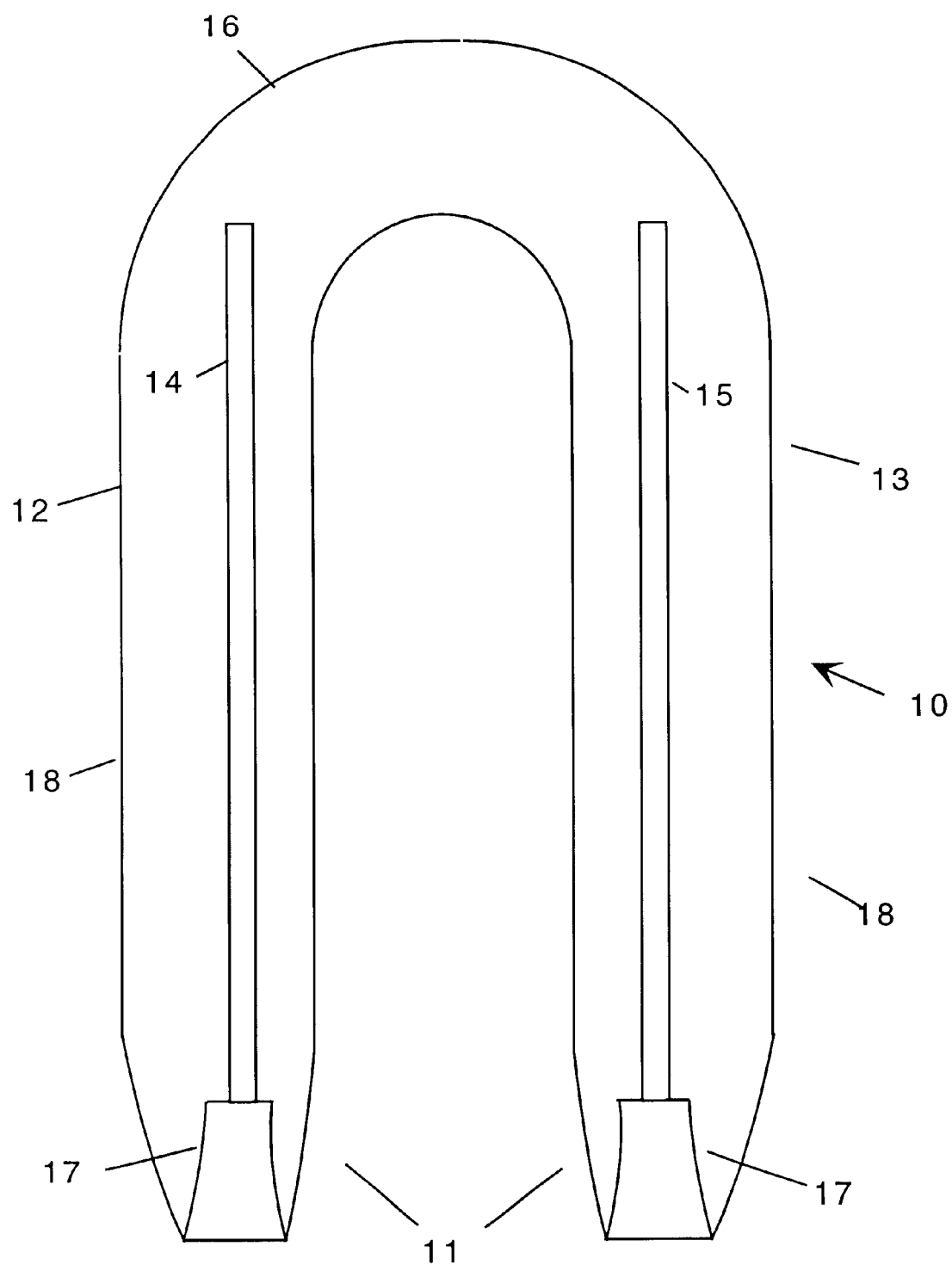
FIG. 2 is a top view of the ski without the mounting brackets.
Figure 10:
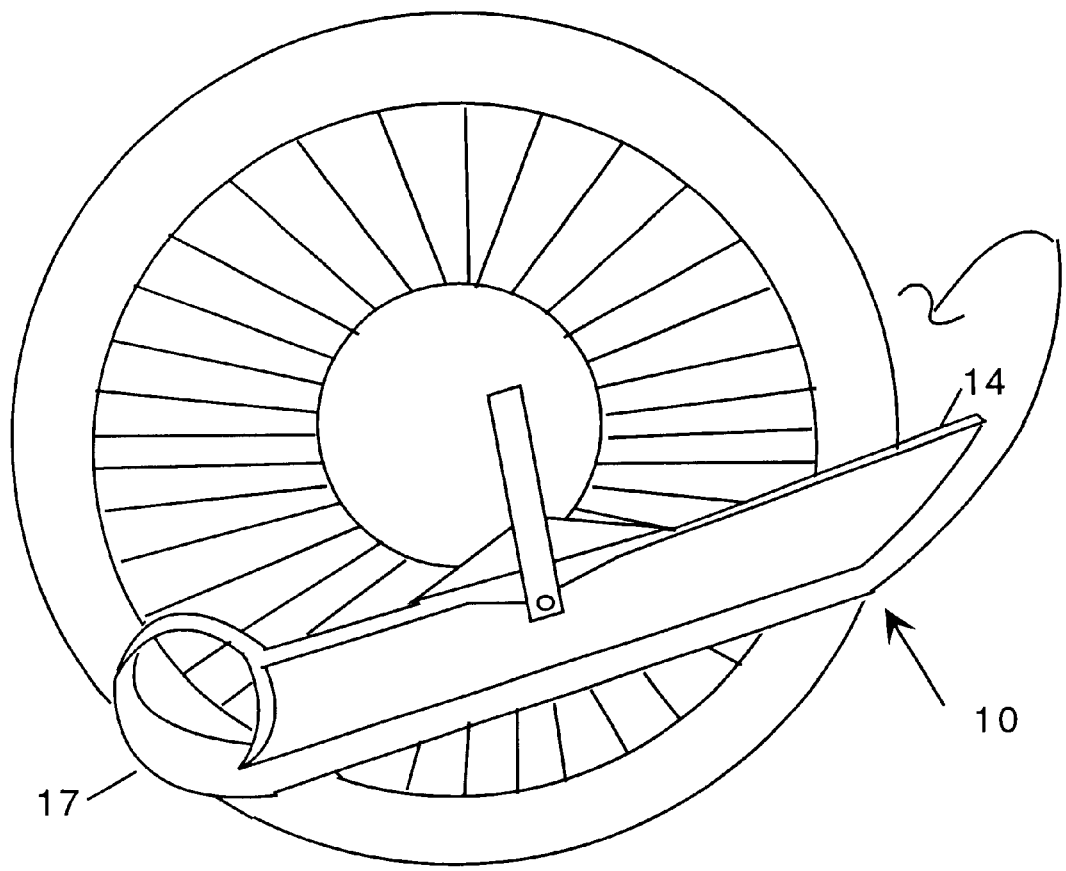
FIG. 10 is a partial perspective view of the invention attached to a motorcycle wheel.

Referring now to FIGS. 1 and 2, details of the ski 10 are shown. FIG. 2 shows the ski 10 as having a generally ovular shape in plan view. The rear portion 11 of the ski 10 is open to allow it to fit around the front tire of a motorcycle or similar vehicle. This creates two bodies 12 and 13 that help maintain stability while riding on soft surfaces. As shown on FIG. 2, two fins 14 and 15 are formed on the ski 10 as shown. The fins 14 and 15 are made from either rubber or plastic. They deflect snow off the ski to prevent it from building up to the point that curved handles 17 throw the snow up into the rider's face. See also, FIG. 1. As shown in FIG. 2, the ski 10 has a curved front piece 16 that connects body 12 to ski body 13 shown in the figure. FIG. 1 shows the curved front 16 also curves upwards as shown. At the back of the ski 10 is a curved portion 17. This curved portion is used allow a push or pull the motorcycle in soft ground or snow without having the ski dig into the surface. The curved portions 17 also act as handles for lifting the front wheel when loading the motor cycle of if it gets stuck. Note that the curved portion 17 is formed by heating an extended part of the back of the ski bodies 12 and 13 and rolling them over forms to curve them over as shown in the drawings, such as FIG. 10.

Also shown in FIG. 2 are two metal edges 18. These metal edges give better support and stability when riding on ice.

FIG. 1 also shows the preferred mounting hardware 20. This hardware is discussed below.

Figure 3:
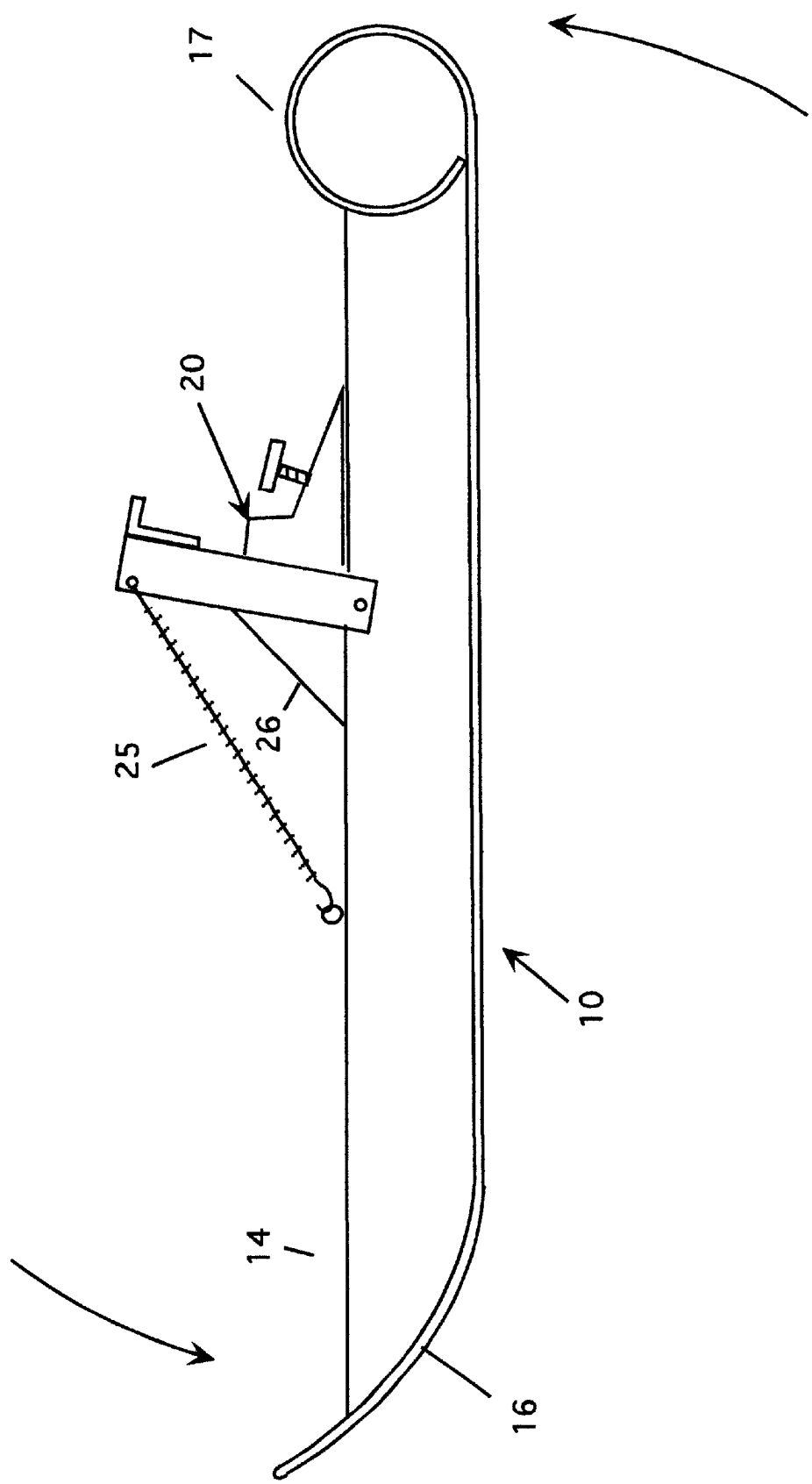
FIG. 3 is an outboard side detail view of the ski showing its pivoting action.

FIG. 3 is an outboard side detail view of the ski showing its pivoting action. A pair of springs 25 holds the ski in the angled position of FIG. 1. The forward angle bracket 26 is also used to hold the ski in this "attack" position. Note that the springs 25 can be small shock absorbers. The shock absorbers give better control of pressure on the ground. Note that below, when the term "spring" is used, it is synonymous with shock absorber.

As pressure is applied to the ski (such as when the ski is in soft snow, the weight of the motorcycle causes the front wheel to sink down. As the ski contacts the snow, it pivots as shown by the arrows of FIG. 3. This pivot action causes the front wheel to be stabilized. The ski then keeps the motorcycle from sinking deeper. After the soft material is gone, the front wheel is free and the spring 25 then pulls the ski back up to its resting position (FIG. 1). This movement is opposite that of the arrows shown in FIG. 3.

Figure 4:
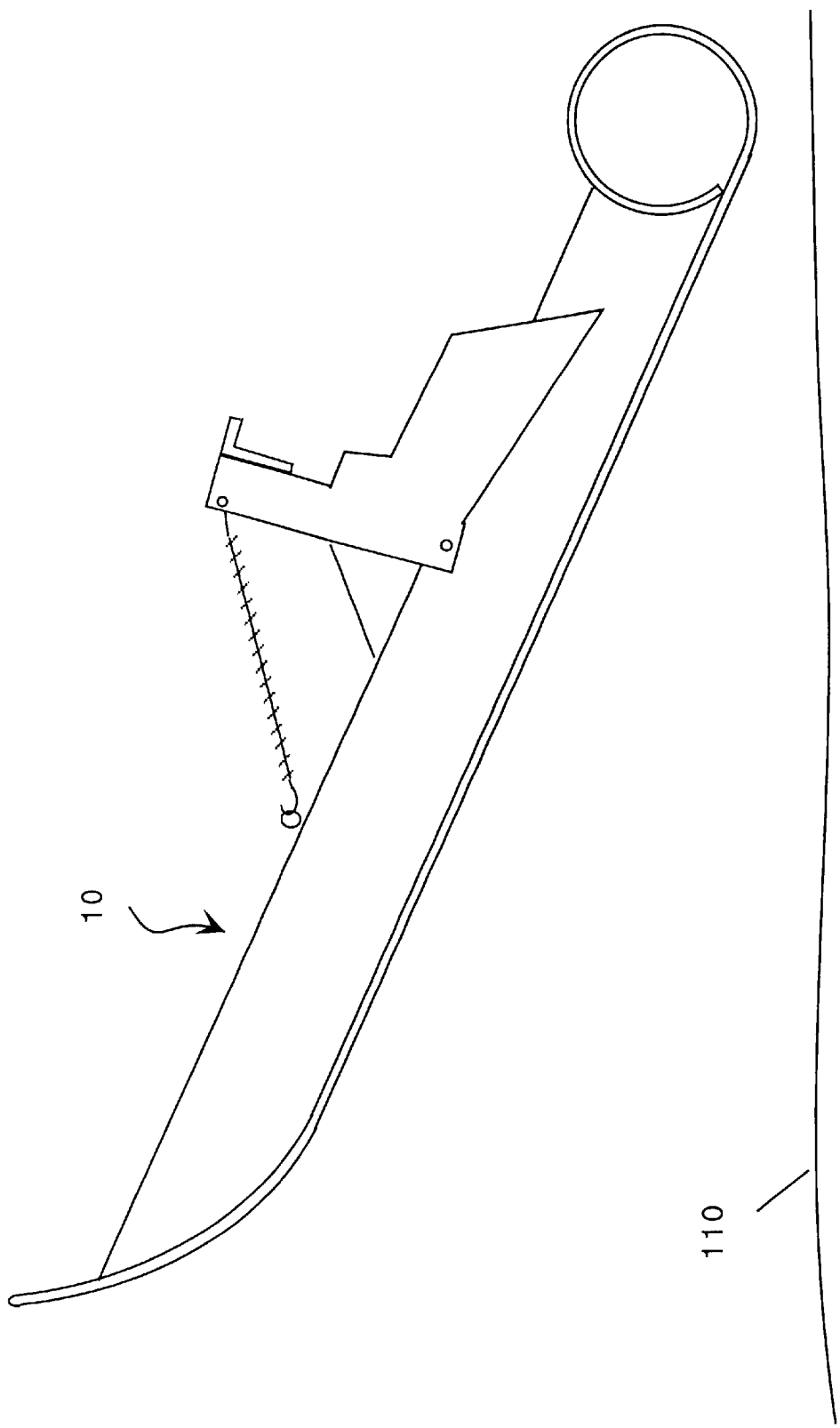
FIG. 4 is an inboard view of the ski shown in its operating position with respect to the ground.

FIG. 4 is an inboard view of the ski shown in its normal "at rest" position with respect to the ground. At this point, the ski begins to settle onto the surface and then pivots as shown in FIG. 3.

Figure 5:
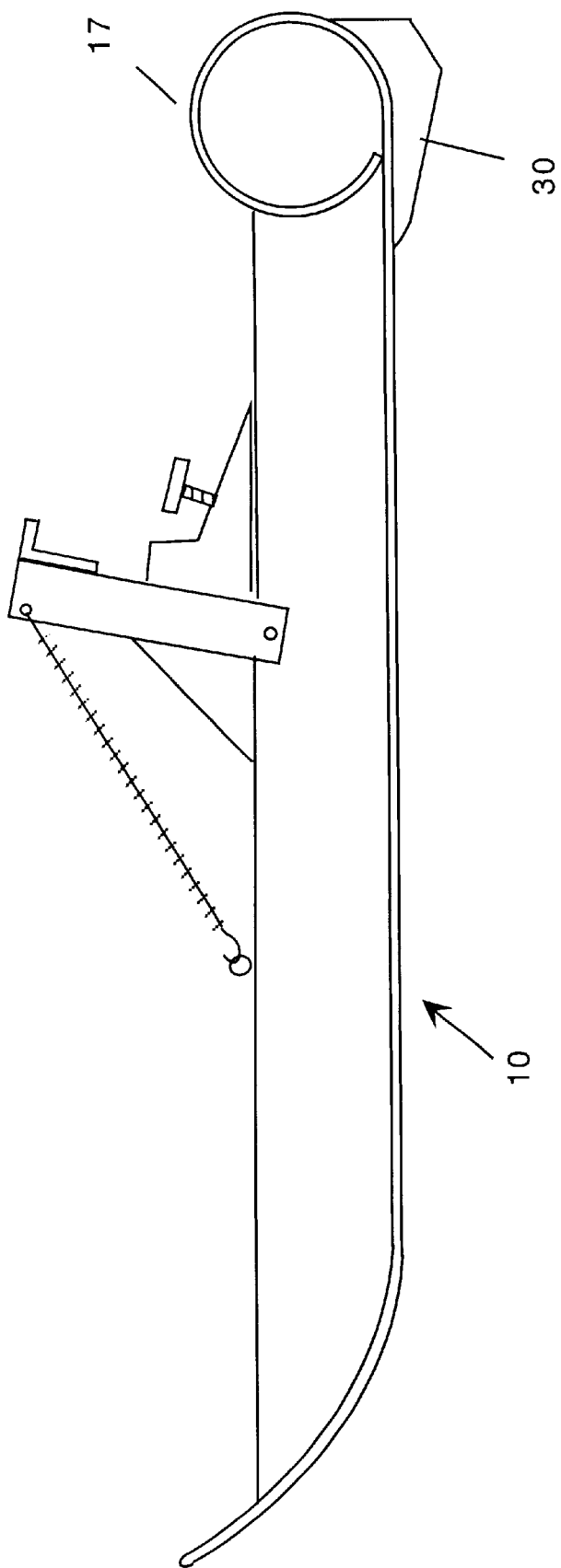
FIG. 5 is a side view of a ski showing a steering rudder attached to the rear of the ski.

FIG. 5 is a side view of a ski showing a steering rudder 30 attached to the rear of the ski. This rudder 30 can help control steering in soft earth or snow. The rudders 30 are removable so that they are not damaged when riding in rocks, gravel or dirt.

Figure 6:
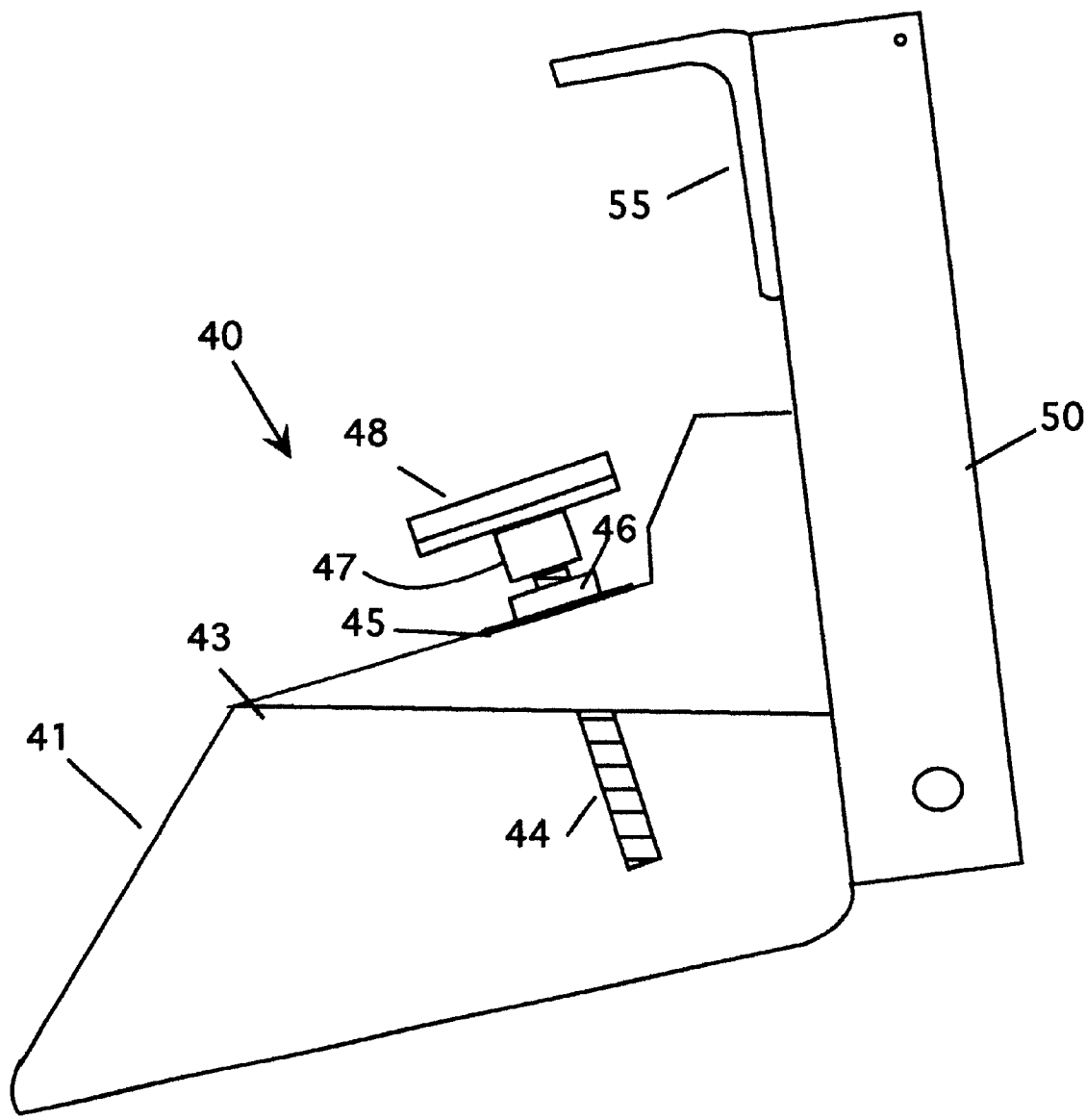
FIG. 6 is a detail view of a universal-mounting bracket that allows the ski to be attached to a variety of motorcycles.

FIG. 6 is a detail view of one embodiment of a universal-mounting bracket 40 that allows the ski to be attached to a variety of motorcycles. This bracket is made up a several parts. Note that for each installation, two of these brackets are required (one for each side of the ski). A sliding guide 41 may be used, if needed to hold the ski on line with a load bearing brace 43. In some embodiments, this guide may be omitted, as discussed below. The load bearing brace 43 is used to bear the load. This may be installed on top of the sliding guide 41 if it is used, or may be formed directly on the ski 10. In some embodiments, the brace 43 is drilled and tapped to support an adjuster bolt 44. The adjuster bolt 44 is a bolt about 3 inches long. The bolt height may be adjusted to accommodate different fork designs. A washer 45 is used to support a locking nut 46 that retains the position of the bolt 44. At the top of the bolt 44 is a solid washer 47 and a plastic bumper 48. The plastic bumper is designed to fit under the fork of the motorcycle.

Figure 8:
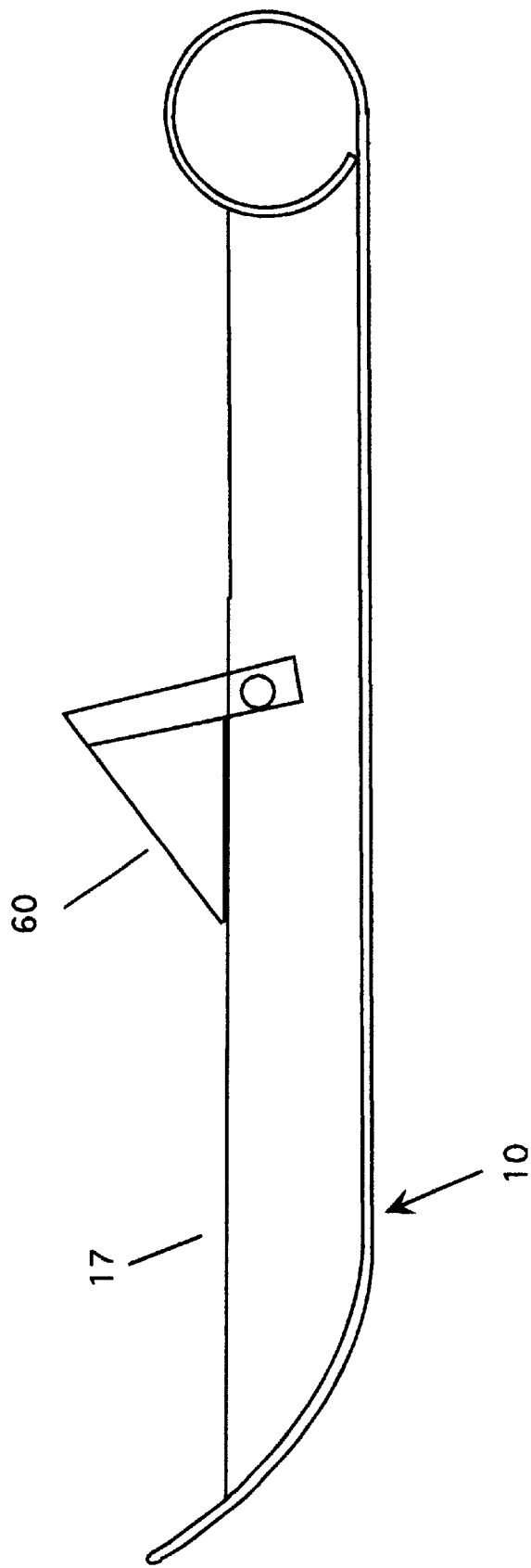
FIG. 8 is a side detail view of a ski with the mounting bracket removed, showing a front stopper brace installed. This brace works to maintain the ski in its "attack" position while moving over soft surfaces.

In the preferred embodiment, the load bearing brace is the only item needed. The brace 43 is attached to the ski. The "C" channel 50 (discussed below) is attached directly to the brace 43. In this embodiment, the adjuster bolt is eliminated. This embodiment is shown in FIG. 8.

Figure 7A:
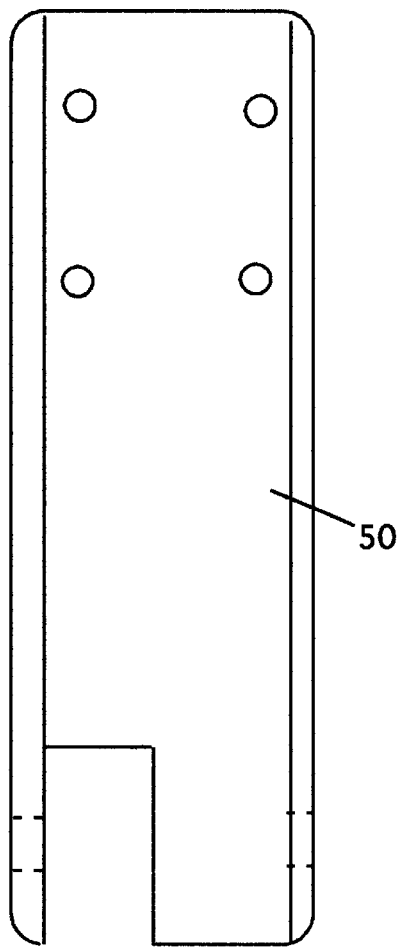
FIG. 7a a front view of a "C" channel used as part of the universal-mounting bracket.

A "C" channel 50 is attached to the rear of the mounting bracket 40. FIG. 7a is a front view of the "C" channel 50 that is used as part of the universal-mounting bracket. It has a "four bolt pattern" at one end. This pattern of boltholes fits most motorcycles from 1980 to 1996 and some later models (1997 to 2000). For these years, most motorcycles have at least two bolts and some have four studs with nuts that clamp the bottom of the fork to the axle. To mount the ski on motorcycles that use bolts, the bolts are removed, the adapter plate is selected that conforms to the bolt (or stud) pattern, and the adapter plate is secured to the ski (one on each side). The ski is then positioned to align the adapter plate with the studs or bolt holes and the bolts or nuts are installed and tightened. In one embodiment, the adjuster bolt is adjusted up firmly against the fork bottom and secured with a lock nut. In another embodiment, the adjuster nut is omitted.

As noted above, on some models, four studs and nuts are used in place of bolts. For these motorcycles, the two outer studs are removed and replaced with studs that are approximately ¼ inch longer than the original studs. The ski with just the "C" channel is positioned so that the studs align with the four holes in the "C" channel bracket. The "C" channel 50 is then placed over the studs and the clamp is secured with nuts. As before, if the adjuster bolt is used, it is tightened up against the bottom of the fork and the lock nut is then secured to hold it in place.

Figure 7B:
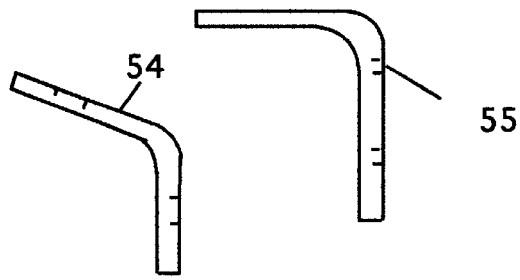
FIG. 7b is a detail view of two modified mounting plates that fit different brands of motorcycles.
Figure 7C:
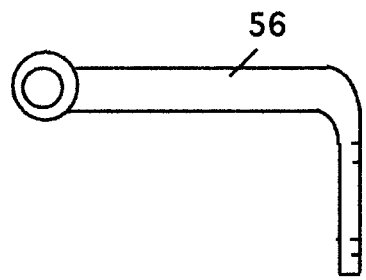
FIG. 7c is a side view of an adopter clamp, used on some motorcycles.
Figure 7D:
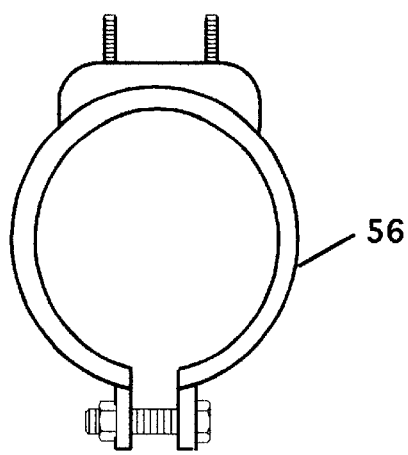
FIG. 7d is a top view of the adopter clamp of FIG. 7c.

FIG. 7b is a detail view of two modified mounting plates 54 and 55 that fit different brands of motorcycles. FIG. 7c is a side view of an adopter clamp 56, used on some motorcycles. FIG. 7d is a top view of the adopter clamp 56. All these brackets can be used as need to attach the ski to any number of motorcycles, following similar steps to those described above. In this way, the ski can be attached to a variety of motorcycles. For example, the plates allow the ski to be mounted on all full size YAMAHA YZ type motorcycles as well as all the moto-cross type motorcycles made by KAWASAKI, SUZUKI, YAMAHA AND HONDA.

FIG. 8 is a side detail view of a ski with the mounting bracket removed, showing a front stopper brace 60 installed. This view shows the brace more clearly. This brace works to maintain the ski in its "attack" position while moving over soft surfaces, as discussed above.

Figure 9A:
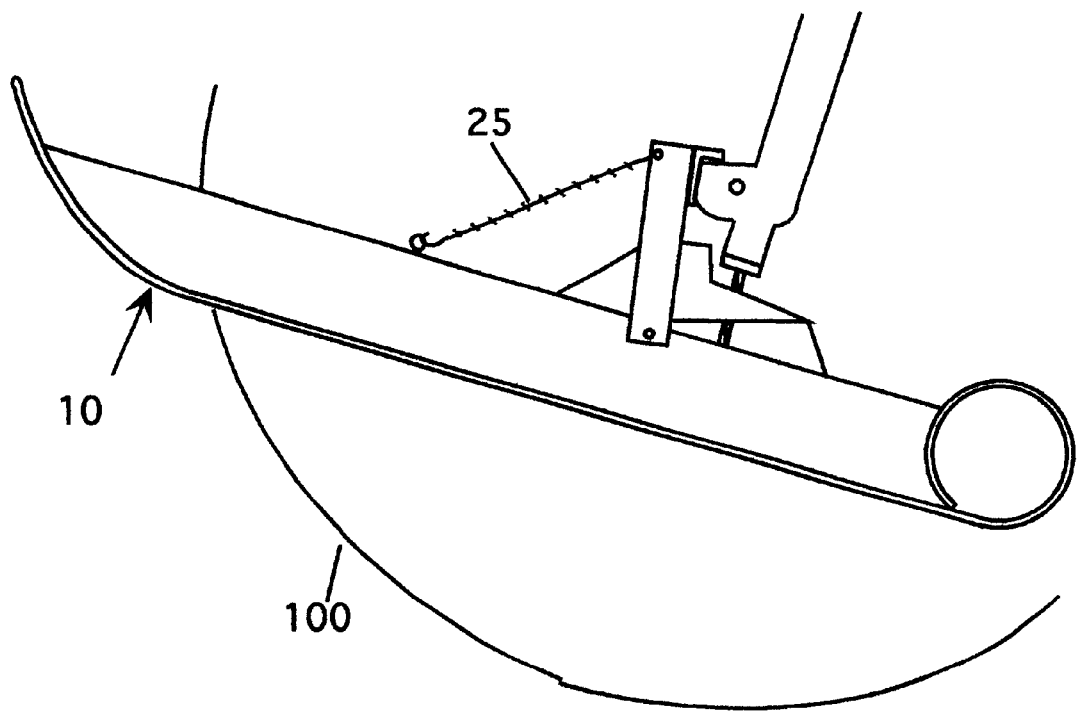
FIG. 9a shows the ski on a tire in the normal "attack" position.

FIG. 9a shows the ski on a tire 100 in the normal "attack" position. Note that the ski 10 normally rides above the bottom of the tire 100, just under the axle. Note that this figure also shows the installation of the universal-mounting bracket.

Figure 9B:
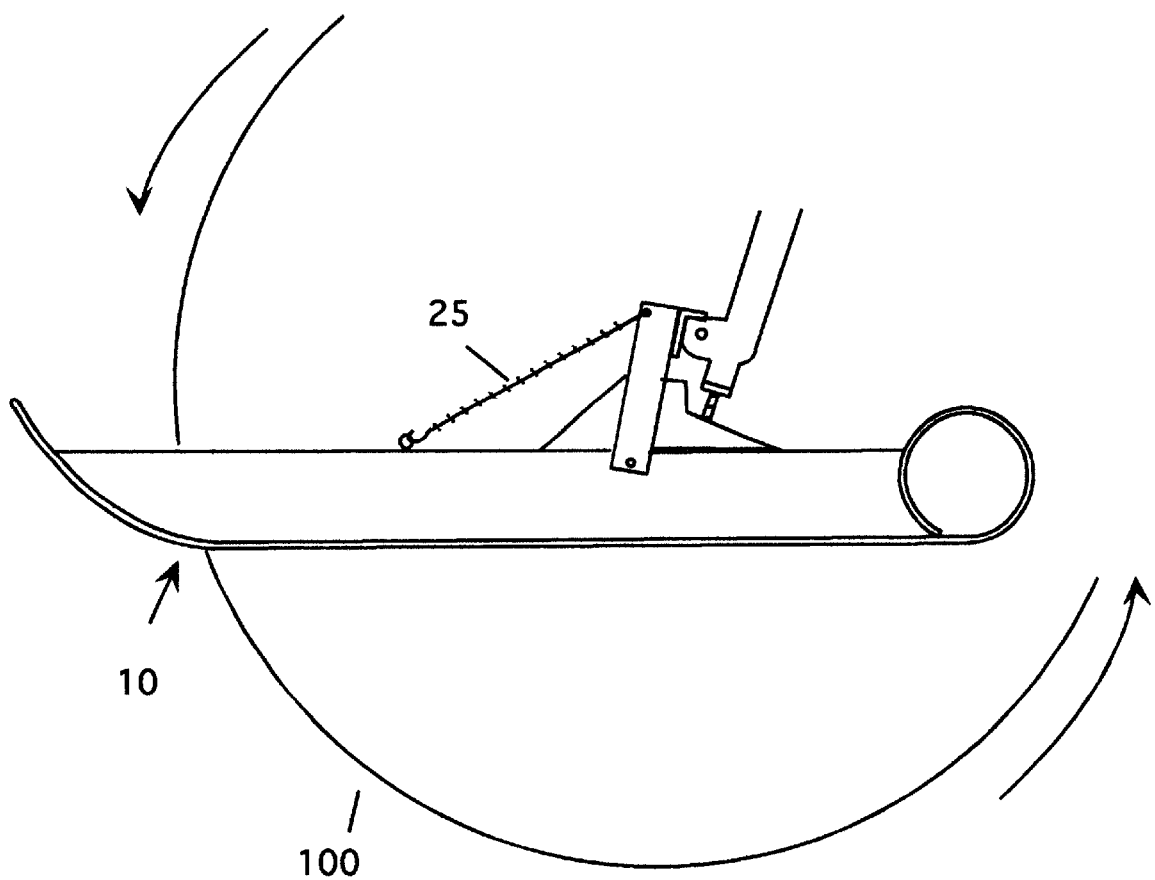
FIG. 9b shows the ski on a tire showing the pivoting action as the tire sinks into soft material.

FIG. 9b shows the ski on a tire showing the pivoting action as the tire sinks into soft material. Note that the ski 10 levels off, but maintains it height on the wheel.

The spring action of the ski enables it to work automatically. On normal surfaces, the ski is out of the way and does not interfere with the motorcycle's operation. When the motorcycle contacts a soft ground surface, the front tire begins to sink. The back of the ski then makes contact with the ground. The force on the ski then overcomes the resistance of the spring 25 and the ski pivots to the position in FIG. 9b. As long as sufficient force remains on the ski, the ski stays in the flattened position. Once the loading is off the ski, however, the spring 25 pulls the ski back up into its attack position. Thus, once the ski is installed, a rider does not have to be concerned about its operation. In this way, the rider can concentrate on operating the motorcycle and not the ski. This makes riding a motorcycle easier and safer.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A ski for light-weight wheeled vehicles comprising:
  a) a U-shaped ski member, having a front piece and a pair of oppositely disposed sides having an open channel therebetween;
  b) wherein each of said pair of oppositely disposed sides has a universal-mounting bracket installed thereon, and further wherein said mounting bracket includes:
    i) a sliding guide, attached to said ski;

ii) a load bearing brace, installed on top of the sliding guide;
iii) an adjuster bolt, adjustably installed in said load bearing brace;
iv) a means for retaining said adjuster bolt in a desired position;
v) a bumper, fixedly attached to the top of said adjuster bolt to fit said adjuster bolt against the bottom of a vehicle fork; and
vi) a "C" channel bracket, operably attached to said load bearing brace to attach said ski to a vehicle's fork;

c) a means for holding said U-shaped ski member in an upward angled position with respect to a level surface below a wheel of a vehicle, whereby said means for holding has a resistance; and d) a means for pivoting said U-shaped ski member from said upward angled position to a horizontal position when said resistance of said means for holding is overcome by a pressure on said U-shaped ski member.

2. The ski of claim 1 wherein the universal mounting bracket further includes at least one adapter bracket, adjustably attached to said "C" channel bracket.

3. The ski of claim 1 wherein the means for holding said U-shaped ski member in an upward angled position with respect to a level surface below said wheel of said vehicle includes a spring.

4. The ski of claim 1 further comprising a pair of deflector shields, fixedly attached to said U-shaped ski member.

5. The ski of claim 1 wherein the U-shaped ski member has an upwardly curved front end.

6. The ski of claim 1 wherein the U-shaped ski member has a back end and further wherein the back end of said U-shaped ski member has a pair of curved handle portions.

7. The ski for motorcycles and the like of claim 1 wherein the universal mounting bracket comprises:

a) a brace; and b) a "C" channel, wherein said "C" channel has at least one mounting hole formed therein.

8. The ski of claim 7 wherein the universal mounting bracket further includes at least one adapter bracket, adjustably attached to said "C" channel.

* * * * *